(12) United States Patent
Forrest et al.

(10) Patent No.: US 7,590,612 B2
(45) Date of Patent: Sep. 15, 2009

(54) BLOG MAP FOR SEARCHING AND/OR NAVIGATING THE BLOGOSPHERE

(75) Inventors: Brady D. Forrest, Seattle, WA (US); Christopher B. Weare, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 143 days.

(21) Appl. No.: 11/155,393

(22) Filed: Jun. 17, 2005

(65) Prior Publication Data
US 2006/0284873 A1 Dec. 21, 2006

(51) Int. Cl.
*G06N 7/00* (2006.01)
*G06N 7/08* (2006.01)

(52) U.S. Cl. ...................................... 706/55

(58) Field of Classification Search ............. 707/3, 707/5, 100; 706/48, 59, 12, 13, 15
See application file for complete search history.

(56) References Cited

U.S. PATENT DOCUMENTS

2005/0004949 A1* 1/2005 Trepess et al. ........... 707/104.1

OTHER PUBLICATIONS

'The anatomy of a hierarchical clustering engine for web pages, news and book snippets': Ferragina, 2004, IEEE, 0-7695-2142.*
'Self Organization of a Massive Document Collection': Kohonen, 2000, IEEE, 1045-9227, pp. 574-585.*
Tuevo Kohonen et al., "Self Organization of a Massive Document Collection", May 2000, IEEE Transactions on Neural Networks, p. 574-585, vol. 11, No. 3, IEEE.

* cited by examiner

*Primary Examiner*—David R Vincent
*Assistant Examiner*—Peter Coughlan
(74) *Attorney, Agent, or Firm*—Shook, Hardy & Bacon LLP (57) ABSTRACT

A blog map for searching and/or navigating the blogosphere is provided. In accordance with one method for generating a blog map, a number of blog posts within the blogosphere are accessed. Each of the blog posts is converted to a feature vector, which represents the position of the blog post in a high-dimensional space. The dimensionality of the feature vectors is reduced from the high-dimensional space to a low-dimensions space, such that each blog post is represented in the low-dimensional space. A map is then generated based on the position of the blog posts in the low-dimensional space.

19 Claims, 5 Drawing Sheets

BLOG MAP FOR SEARCHING AND/OR NAVIGATING THE BLOGOSPHERE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

"Blogosphere" is a term used to describe the totality of all blog-related websites. Generally, a blog is a web-based journal that contains periodic posts, normally in reverse chronological order. The posts are typically added by the author of the blog, but some blogs allow readers to also add comments. The variety and number of blogs within the blogosphere has grown exponentially since the inception of blogging.

It is often difficult to quickly get an idea as to what is being discussed across the blogosphere. Because blog content is self-authored without any editorial control, there is often very little structure to most blogs. Moreover, blogs are not easily broken down into distinct categories as an individual blog may contain a wide variety of topics. Accordingly, the nature of blogs, as well as the rapid growth of the blogosphere, creates a challenge for users to quickly gleam what the top topics are that are being discussed in the blogosphere or to locate blogs containing topics of interest.

One current approach for tracking topics on the blogosphere tends to focus only on the top sites that are being linked to at any given moment without regard to the content each site carries. When the number of blogs was low, this model was somewhat satisfactory because there was not a great variety in the types of blogs available. Today, however, blogs cover just about every topic imaginable and users are typically only interested in a small subset of the topics discussed on blogs.

Another approach for tracking topics on the blogosphere allows authors to "tag" pieces of content or terms when writing posts on blogs. However, this is a manual effort that relies on individuals' opinions of what content is important. Moreover, blogs that do not employ such "tags," although relevant, are not included in the approach.

Accordingly, a tool to organize the blogosphere in such a way that is predictable so users can quickly understand what topics are being discussed in the blogosphere would be desirable. Additionally, a tool that allows users to focus on areas of interest within the blogosphere would be advantageous. Further, it would be advantageous if the tool was automatically generated without requiring individuals to manually mark content on blogs.

BRIEF SUMMARY

Embodiments of the present invention relate to a blog map that facilitates searching and/or navigating the blogosphere. Accordingly, in one aspect, an embodiment of the invention is directed to a method for generating a map to facilitate searching and navigating the blogosphere. The method includes accessing blog posts from a number of blogs within the blogosphere. The method also includes converting each blog post to a feature vector. Each feature vector represents a position of a blog post in a high-dimensional space. The method further includes reducing the dimensionality of each feature vector from the high-dimensional space to a low-dimensional space to provide a representation of a position of each blog post in the low-dimensional space. The method then includes generating a map based on the position of each blog post in the low-dimensional space.

In another aspect of the invention, an embodiment relates to a method of providing information regarding topics on blog posts within the blogosphere. The method includes displaying a blog map on a display. The blog map may have a number of blog posts mapped to it and a number of labels displayed on it. The method also includes receiving a map entry selection signal indicative of a user interface selection device pointing at an area of the blog map on the display. In response to the selection signal, information relating to the area of the blog map is communicated.

In a further aspect, an embodiment of the invention is directed to a system for generating a blog map to facilitate searching and navigating the blogosphere. The system includes a blog post accessing component, a feature vector conversion component, a dimensionality reduction component, and a map generating component. The blog post accessing component is capable of accessing a number of blog posts from the blogosphere. The feature vector conversion component is capable of converting each of the plurality of blog posts to a feature vector. Each feature vector represents a position in a high-dimensional space for one of the blog posts. The dimensionality reduction component is capable of reducing each feature vector from the high-dimensional space to a low-dimensional space to provide a representation of a position in the low-dimensional space for each blog post. The map generating component is capable of generating a blog map based on the position in the low-dimensional space for each blog post.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide a blog map for searching and navigating the blogosphere. In one embodiment, the blog map may be generated by first accessing blog posts. Each blog post is then converted to a feature vector that represents a position of the blog post in a high-dimensional space. Generally, a high-dimensional space is one having more than three dimensions. The dimensionality of the feature vectors is the number of unique words within all the accessed blog posts, which may be several hundred thousand to over a million. The dimensionality of the feature vectors is reduced to a low-dimensional space, which allows for the relationships between the blog posts to be more readily understandable to a user. A map is then generated based on the positions of the blog posts in the low-dimensional space. The map may be labeled to allow users to locate topics within various parts of the map.

Having briefly described an overview of the present invention, an exemplary operating environment for the present invention is described below.

Figure 1:
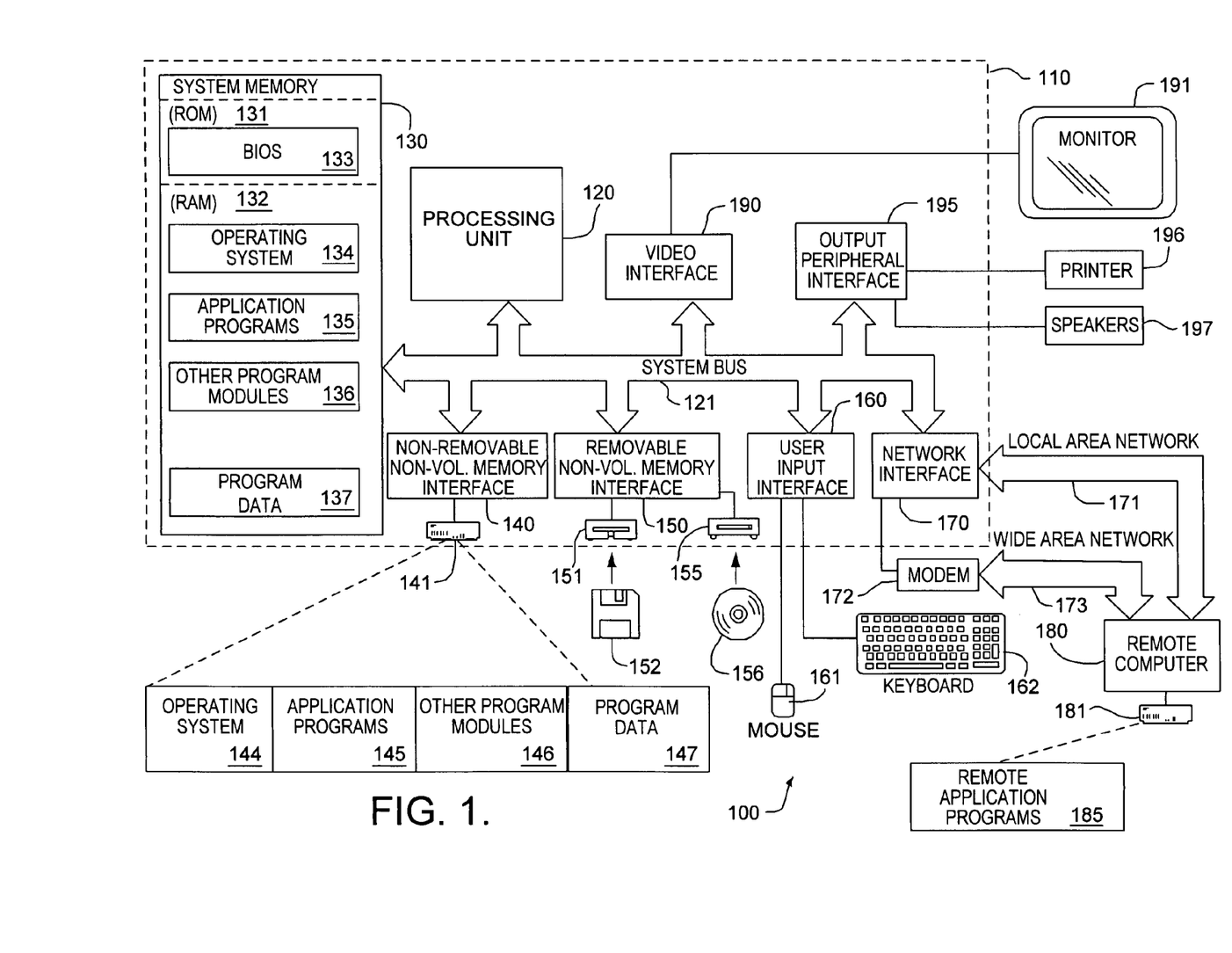
FIG. 1 is a block diagram of an exemplary computing environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

Figure 2:
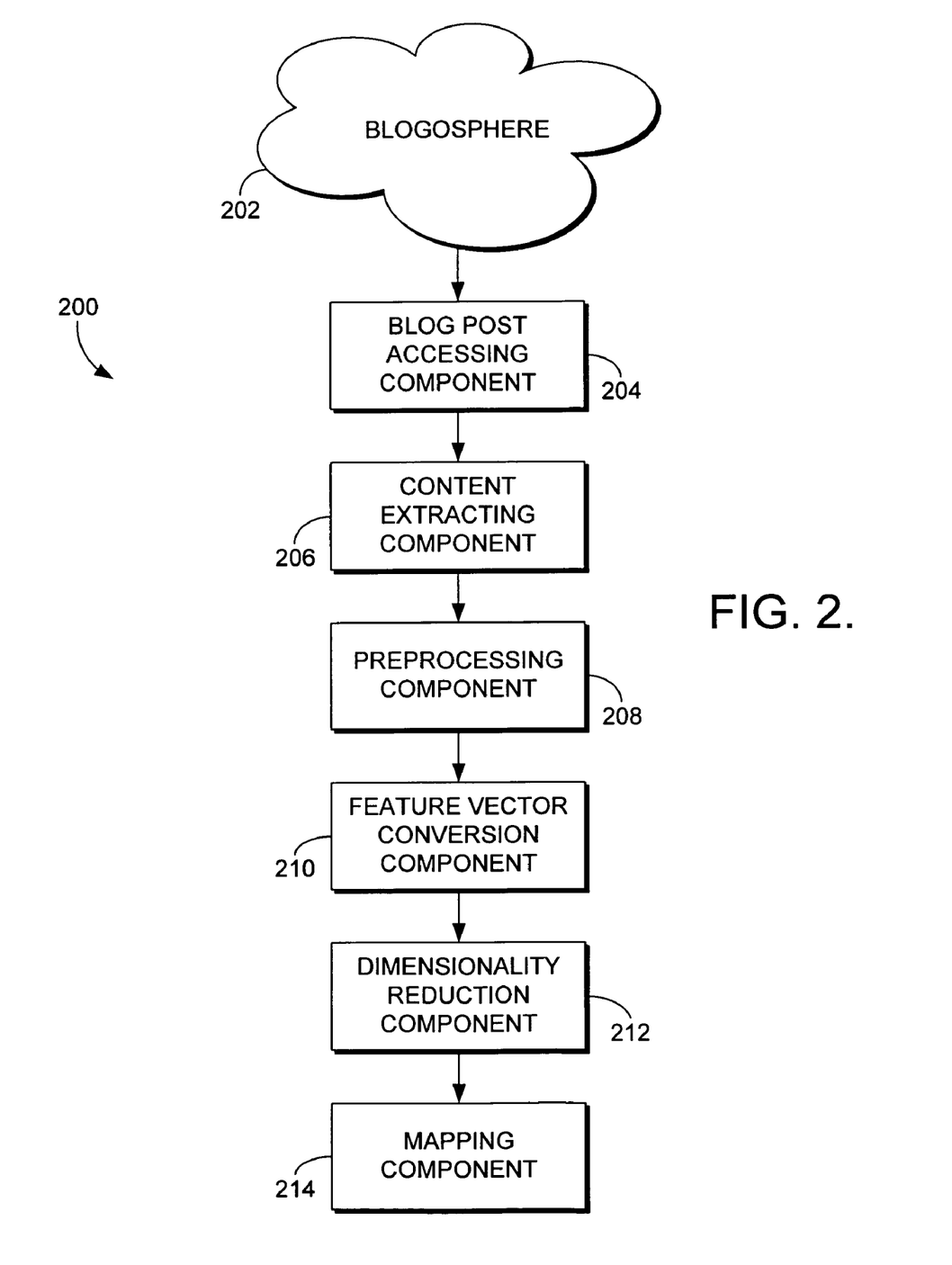
FIG. 2 is a block diagram of an exemplary system for generating a blog map in accordance with an embodiment of the present invention.

As previously mentioned, embodiments of the present invention relate to generating a blog map to facilitate searching and navigating the blogosphere. Turning to FIG. 2, a block diagram is illustrated which shows an overall system 200 for retrieving blog posts from the blogosphere 202 and generating a blog map based on the content contained within each of the blog posts in accordance with an embodiment of the present invention.

The system 200 includes a blog post accessing component 204 that may access blog posts from the blogosphere 202. As mentioned previously, the blogosphere 202 is the totality of all blog-related websites. In various embodiments of the invention, the blog post accessing component 204 may access blog posts from all blogs within the blogosphere or from only a subset of the blogosphere. Further, the blog post accessing component 204 may access all blog posts or only a subset of blog posts from each blog.

The system also includes a content extracting component 206 that examines the content of each blog post accessed by the blog post accessing component 204 and compiles a list of words for each blog post. First, the content extracting component 206 extracts words from each of the blog posts accessed by the blog post accessing component 204. In addition, the content extracting component 206 may employ phrasal extraction to extract phrases, such as "tropical storm" or "human embryo." Each phrase may then be treated as a discrete word and added to the list of words for the respective blog post. The content extracting component 206 may also extract words and/or phrases from sites referenced in a blog post and add the words and/or phrases to the list for that particular blog post.

In some embodiments of the present invention, the content extracted from each blog post by the content extracting component 206 may be preprocessed. Accordingly, a number of preprocessing functions may be performed by a preprocessing component 208. First, the preprocessing component 208 may include stemming functionality for standardizing the words from the blog post. Stemming transforms each of the words to their respective root words. Next, the preprocessing component 208 may include stop-word filtering functionality for identifying and filtering out stop words, that is, words that are unimportant to the content of the blog post. In general, stop words are words that are, for example, too commonly utilized to reliably indicate a particular topic. Stop words are typically provided by way of a pre-defined list and are identified by comparison of the stemmed word sequence with the pre-defined list. Further, the preprocessing component 208 may include low-usage word removal functionality for removing words that appear less frequently than a certain pre-defined threshold. A number of other preprocessing functions may be further performed by the preprocessing component 208 within the scope of the present invention, such as, for example, removal of HTML tags, advertisements, and other non-interesting page elements or irrelevant content.

The system 200 further includes a feature vector conversion component 210 for converting each blog post to a feature vector. A feature vector provides a representation of a blog post in a high-dimensional space. Generally, a high-dimensional space is one having more than three dimensions. Each feature vector comprises a collection of word and weight pairs (including phrase and weight pairs in some embodiments). Based on the content extracted by the content extracting component 206 and preprocessed by the preprocessing component 208, the feature vector conversion component 210 determines a weight for each word contained in each of the blog posts. The feature vector conversion component 210 then compiles the word/weight pairs for each blog to generate a feature vector for each blog post. Thus, the dimensionality of each feature vector is the number of unique words in the collection of accessed blog posts.

By producing feature vectors, the relationship between the content of blog posts may be represented by the distance between feature vectors in the high-dimensional space. However, it is difficult for users to quickly recognize the relationships in the high-dimensional space. Therefore, the system 200 also includes a dimensionality reduction component 212 that receives the feature vectors generated by the feature vector conversion component 210 and reduces the dimensionality of the feature vectors from the high-dimensional space to a low-dimensional space. The low-dimensional space typically will be either a one-, two-, or three-dimensional space. Thus, the dimensionality reduction component 212 provides a representation of each blog post in a low-dimensional space.

Using the low-dimensional coordinates for each blog post generated by the dimensionality reduction component 212, a mapping component 214 may generate a map that may readily present to users the relationships between content contained in accessed blog posts. The mapping component 214 determines a position on the map for each blog post that corresponds to the low-dimensional coordinates for each blog post as determined by the dimensionality reduction component 212. The mapping component 214 may also determine positions for blogs within the map based on the average position of all blog posts for a respective blog. Labels may then be placed on the map to facilitate recognition of content within different regions.

Figure 3:
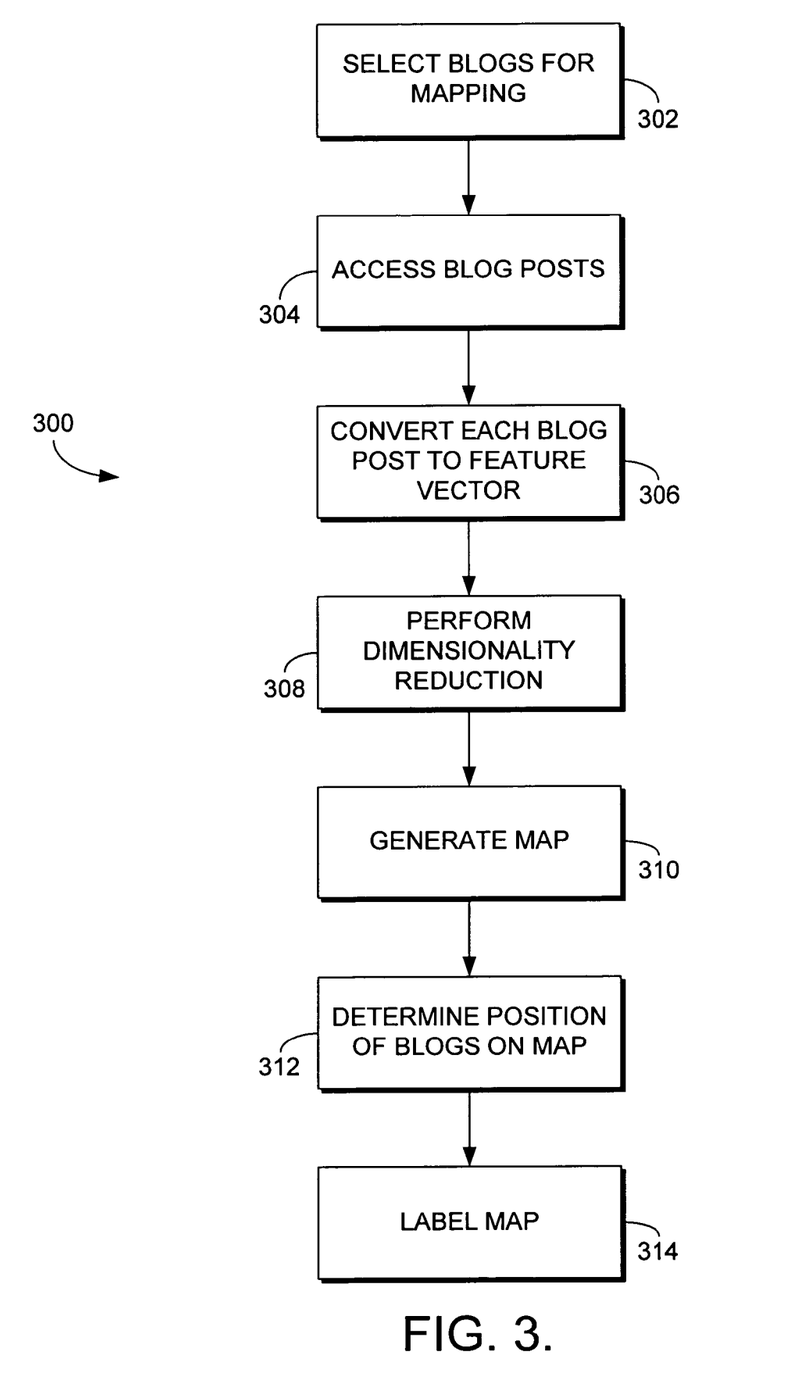
FIG. 3 is a flow diagram showing a method for generating a blog map in accordance with an embodiment of the present invention.

Referring now to FIG. 3, a flow diagram is illustrated which shows a method 300 for generating a blog map to facilitate searching and/or navigating the blogosphere. Initially, blogs are selected for mapping, as shown at block 302. Generally, any subset of the blogosphere or the entire blogosphere may be mapped within the scope of the present invention. Blog posts are then accessed from each of the selected blogs, e.g., by using the blog post accessing component 204 (FIG. 2), as shown at block 304. In some embodiments of the present invention, all blog posts contained within each selected blog are accessed. In other embodiments, only a subset of all blog posts contained within each blog is accessed. Typically, the blog posts from a selected period of time are accessed for each blog. For example, blog posts from the past month or the past week may be accessed.

After the blogs posts have been accessed, each blog post is converted to a feature vector, e.g., by using the feature vector conversion component 210 (FIG. 2), as shown at block 306. Generally, a feature vector is a collection of word and weight pairs (including phrase and weight pairs in some embodiments). The weight of each word may be determined by a text information retrieval practice, such as TFIDF (term-frequency inverse document frequency) or other appropriate method. The feature vector for each blog post provides a representation of the position of the respective blog post in a high-dimensional space. The dimensionality of each feature vector is the number of unique words in the collection of blog posts extracted from the selected blogs.

Figure 4:
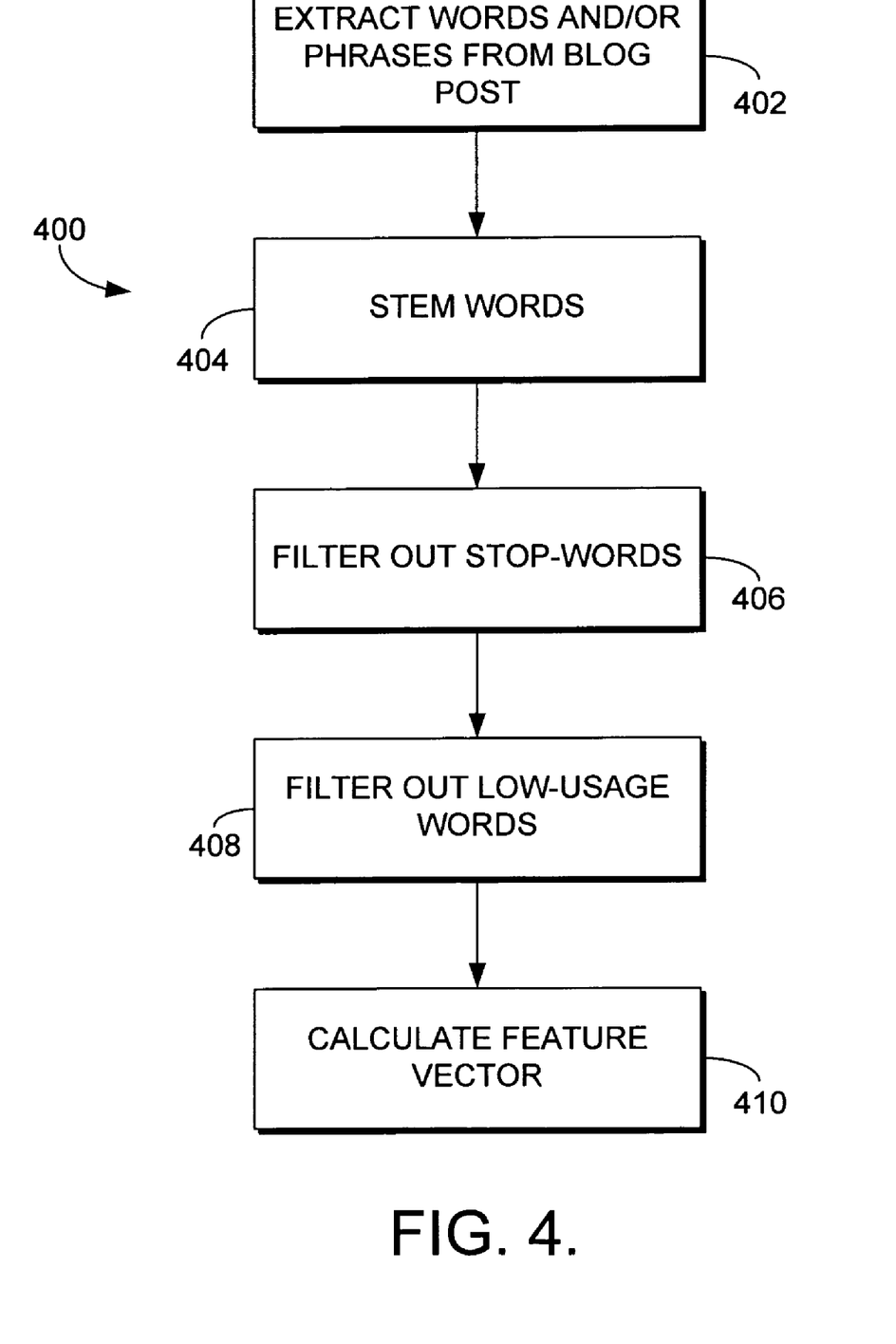
FIG. 4 is a flow diagram showing a method for converting a blog post to a feature vector in accordance with an embodiment of the present invention.

One method 400 for converting a blog post to a feature vector in accordance with an embodiment of the present invention is shown in FIG. 4. Initially, as shown in FIG. 4, words and/or phrases are extracted from the blog post, e.g., using the content extracting component 206 (FIG. 2), as shown at block 402. In some embodiments of the present invention, only individual words are extracted from the blog post. In other embodiments of the present invention, the process may employ phrasal extraction to also pull out phrases, such as "tropical storm" or "human embryo," for example. The process may then treat each phrase as a distinct word.

In an embodiment of the present invention, links to other blogs contained within the blog post may also serve as proxies to content. For example, if a user posts an entry on a first blog that references a second blog, words and/or phrases may be extracted from the second blog and added to the list of words and/or phrases extracted from the entry on the first blog. Further levels of proxies may also be employed to add content to a blog post in various embodiments of the invention. Different weighting may be applied depending on the level of the proxy.

After extracting words and/or phrases for the blog post, a number of preprocessing steps may be performed, although preprocessing is not necessary within the scope of the present invention. Such preprocessing may be performed, e.g., utilizing the preprocessing component 208 of FIG. 2. One preprocessing step may involve stemming for standardizing the words from the blog post to their respective root words, as shown at block 404. Another preprocess step may include stop-word filtering for identifying and filtering out stop words that are unimportant to the content of the blog post, as shown at block 406. Further, the preprocessing may include filtering low-usage words that appear less frequently than a certain pre-defined threshold number, as shown at block 408. One skilled in the art will recognize that the foregoing description of preprocessing steps is exemplary and other forms of preprocessing may be employed within the scope of the present invention.

After preprocessing has been performed, a collection of words and/or phrases has been compiled for the blog post. A feature vector may then be calculated, as shown at block 410. Any statistical technique may be employed to calculate the feature vector within the scope of the present invention. By way of example only and not limitation, a feature vector, $\overline{D_j}$, for a blog post j may be calculated using TFIDF as follows:

$$\overline{D_j} = \sum_i tf_i \cdot \log\left(\frac{N}{dc_i}\right) \cdot \hat{w}_i$$

wherein $tf_i$ is the number of times word i appears in blog post j, N is the total number of blog posts in the collection, $dc_i$ is the number of blog posts in the entire collection that contain the word i, and $\hat{w}_i$ is the unit vector for word i defined as:

$$w_i \cdot w_j = \begin{cases} 0, i \neq j \\ 1, i = j \end{cases}$$

As previously noted, converting each blog post to a feature vector provides a representation of the position of each blog post in a high-dimensional space. The dimensionality of this space is the number of unique words and/or phrases in the collection of all extracted blog posts. This may typically be on the order of several hundred thousand to over a million. Accordingly, to provide a blog map that is readily understandable by a user, the dimensionality of the feature vectors must be reduced to a lower dimensional space, such as a space having one, two, or three dimensions.

Referring again to FIG. 3, the dimensionality of the feature vectors is reduced from a high-dimensional space to a low-dimensional space, as shown at block 308. Any type of dimensionality reduction technique may be employed within the scope of the present invention. By way of example only and not limitation, the dimensionality reduction method may employ an unsupervised learning mechanism, such as the self-organizing map (SOM). Other methods for dimensionality reduction, for example, include multi-dimensional scaling, principal component analysis, and latent semantic analysis. One skilled in the art will recognize that the foregoing dimensionality reduction methods are exemplary and other techniques may be employed within the scope of the present invention.

Dimensionality reduction reduces each blog post to a point in a low-dimensional space, such as a one-, two-, or three-dimensional space. For example, the blog posts may be reduced to a two-dimensional space, in which each blog post may be represented by the combination of an x-component and a y-component. Because the position of each blog post in the low-dimensional space is dependent upon the content it contains, blog posts containing similar content will be located near each other.

After reducing the dimensionality of the blog posts, a map may be generated as shown at block 310. The map may be generated by determining a position on the map for each blog post according to each blog post's position in the low-dimensional space. Thus, positions within the map correspond with positions of each blog post in the low-dimensional space. For example, the map may be a two-dimensional grid comprised of a number of nodes (e.g., a grid having 4096 nodes that is comprised of 64 rows and 64 columns of nodes). Each blog post may be determined to have a position corresponding to a particular node within the grid based on its two-dimensional coordinates. Accordingly, each node within the map may correspond to multiple blog posts, a single blog post, or no blog post.

As shown at block 312, positions on the map for each blog may be determined next. The position of each blog may be determined by taking the resulting position of each blog post for a given blog and calculating the average position for the blog. The position of each blog on the map then corresponds to the calculated average position.

After determining the position of each blog on the map, labels may be generated and placed on the map, as shown at block 314. Labels aid users in determining the content located throughout the blog map by providing a visual representation of topics contained within blogs and blog posts located in various regions of the map. Although numerous types of labels may be generated and positioned on the map within the scope of the present invention, two types of labels will be discussed herein: landmark blog labels and term labels.

Landmark blog labels represent the position of landmark blogs within the blog map. Generally, a landmark blog site is a blog whose position is fairly static over time. In addition, a landmark blog site may be fairly popular. By showing landmark blogs on the map through landmark blog labels, users may quickly identify what type of content is located on different regions of the map.

In some embodiments of the present invention, landmark blogs may be determined by calculating the dispersion of blog posts for each blog. The dispersion is a measure of the variability or spread of positions for the collection of blog posts. Any method for determining the dispersion of blog posts for each blog, such as by calculating the variance or by calculating the standard deviation, for example, may be employed within the scope of the present invention. Blogs that have a dispersion lower than a predetermined threshold are designated as landmark blogs. Each landmark blog then appears on the map at the average position previously determined for that blog.

In other embodiments of the present invention, landmark blogs may be determined by tracking the position of each blog on the map over a period of time. If a blog's position moves significantly over time, the blog is not a good indicator of content in any particular area of the map and therefore is not selected as a landmark blog. In contrast, if a blog's position is relatively stable, the blog will be a good indicator of content and is selected as a landmark blog. Accordingly, blogs whose position remains static within a certain threshold are selected as landmark blogs and a label is provided on the map for each landmark blog.

As mentioned previously, term labels may also be generated and added to the map at block 314. Term labels represent words and/or phrases that occur often on blogs and blog posts that map to locations near the position of the term labels. Selection of term labels may be performed by a number of methods within various embodiments of the present invention. By way of example only and not limitation, term labels may be selected by determining words and/or phrases that have the greatest weight for a given portion of the blog map.

Each label may be linked to certain content within an embodiment of the present invention. Typically, a landmark blog label is linked to the actual landmark blog site, while a term label may be linked to a variety of different content. By way of example only and not limitation, a term label may be linked to a blog or a blog post having the greatest weight for the term contained in the label. The term label may also be linked to a list of blogs and/or blog posts that contain the term. A user may then select a particular blog or blog post within the list.

After a blog map has been generated, the map may be continuously updated by adding new blog posts. To update the map, a process similar to method 300 is performed for each new blog post. New blog posts are extracted from the blogosphere either when posted or at a later time. Each new blog post is then converted to a feature vector and the dimensionality of the feature vector is reduced to the same low-dimensional space as that of the map. Each blog post may then be positioned on the map based on its low-dimensional coordinates. After adding new blog posts, blogs may be repositioned on the map as necessary. In addition, the map labeling may be updated to reflect changes in content within areas of the map.

In some embodiments of the invention, the blog map may also be retrained after certain periods of time by using either all new posts or a combination of old and new posts to generate a new map. A process similar to method 300 may be used to generate the new blog map. For example, the blog map may be retrained on a weekly basis, and a sliding window with a 75% overlap may be employed. The map would then be regenerated every week using three weeks of historical blog posts and one week of new blog posts.

Figure 5:
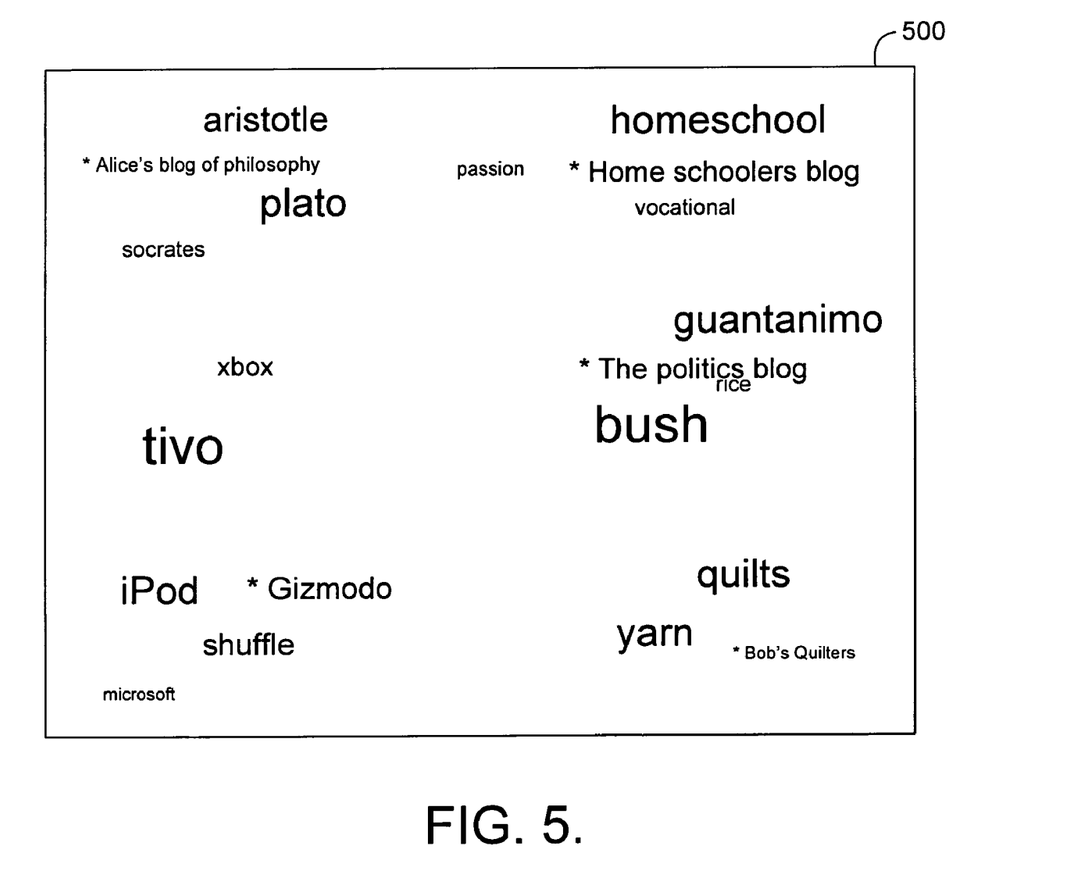
FIG. 5 is an illustrative screen display of an exemplary blog map generated in accordance with an embodiment of the present invention.

Referring now to FIG. 5, an exemplary blog map 500 generated in accordance with an embodiment of the present invention is shown. The blog map 500 shown in FIG. 5 is a representation of how a blog map may appear on a given day (with much of the detail removed to simplify the display). The blog map 500 allows users to quickly get a view of which terms are popular within various areas of the blogosphere. The blog map 500 includes a number of term labels and a number of landmark blog labels (indicated with an asterisk). The size of each term label may be variable. For example, the size may be dependent upon the weight of the term within the area of the map. Likewise, the size of each landmark blog label may be variable and may be based, for example, on the popularity of the landmark blog. Popularity may be defined in many ways. By way of example only and not limitation, the popularity may be based on the number of sites that link to a given blog, the number of users who visit the blog from any other site (as determined by a client-side plugin, for instance), or the number of users who visit that blog directly from the blogosphere.

Similar topics within blogs and blog posts are clustered together within the blog map 500. The labels provide an indication to users of the topics contained within areas of the map 500. For example, a user may recognize that Gizmodo is a popular technology blog and also recognize that the term labels near Gizmodo are technology related terms. Therefore, the user would be able to identify that that the lower left area of the blog map contains technology related topics. Likewise, the user may recognize that the upper left area contains philosophy related topics, the upper right area contains home schooling related topics, the middle right area contains politics related topics, and the lower right area contains quilting related topics.

The blog map 500 also acts as a user interface allowing users to select particular portions of the map to access blogs and blog posts likely to contain topics of interest. In an embodiment, the user interface would include a display, such as the monitor 191, for example, and a user interface selection device, such as the mouse 161, for example. A user may select a portion of the blog map 500 using the interface selection device, causing the system to receive a map entry selection signal indicating the selection. In response, the system would provide information relating to the selected portion of the blog map 500.

The blog map 500 may be useable in a number of ways within the scope of the present invention. For example, as mentioned previously, each label on the map be linked to blogs or blog posts. A user may select a landmark blog label (e.g., by using a mouse, to click on the label) to link to the indicated blog. Likewise, a user may select a term label to find blogs and blog posts containing that term. Typically, the blogs and blog posts containing the greatest weight for the selected term and located near the term label will be provided to the user.

The blog map 500 may also contain a number of zoom levels, allowing a user to zoom in and view more details of a particular area of the blog map 500. At the highest level, only labels having the greatest weight will be displayed on the map. As a user zooms in and views lower levels, additional labels with increasingly lower weight are added to the area being displayed. For example, the view of the blog map 500 shown in FIG. 5 may be the highest zoom level. If a person were to select the region of the map near the Gizmodo label, the portion of the map 500 selected would be displayed (e.g., the lower left corner of the blog map 500). Other technology landmark blogs and technology-related terms would be added to those currently shown in FIG. 5. By continuing to zoom in on the map, a user may be able to pinpoint topics of interest.

In an embodiment of the invention, a representation of individual nodes to which blog posts are mapped may be displayed on the blog map 500. If the map has different zoom levels, the nodes will typically be shown at the lowest zoom level. When a user selects a node (e.g., by using a mouse to click the node), the blog posts that were mapped to the node are displayed to the user. The user then may select and be linked to one of the blog posts.

In addition, the blog map 500 may be searchable. For example, a user may be provided an interface (not shown) to enter a keyword or phrase for which the user would like to find related topics. Based on an entered keyword or phrase, markers may be displayed on the blog map 500 indicating locations that contain topics related to the keyword or phrase. A user may then further navigate through the blog map 500 by selecting a particular marked area.

A user may also be able to set alerts indicating when changes in a particular region have occurred. For example, a user may specify an interest in a region of the map. When the topics associated with that portion of the map change, an alert is generated. The alert may be communicated to the user in a variety of ways, for example, by sending an email to the user, by sending the user a message via an instant messenger, or by sending a message to the user's phone.

As can be understood, embodiments of the present invention provide a blog map for searching and navigating the blogosphere. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media storing computer-useable instructions for causing a computing device to perform a method for generating a map to facilitate searching and navigating the blogosphere, the method comprising:
   accessing blog posts from each of a plurality of blogs within the blogosphere;
   converting each blog post to a feature vector, each feature vector having a dimensionality and representing a position of a blog post in a high-dimensional space;
   reducing the dimensionality of each feature vector from the high-dimensional space to a low-dimensional space to provide a representation of a position of each blog post in the low-dimensional space;
   generating a map based on the position of each blog post in the low-dimensional space;
   receiving data indicative of a user selection of a portion of the map to be monitored for a topic change;
   monitoring the portion of the blog map for a topic change; and
   communicating an alert to a user when a topic change occurs on the portion of the blog map.

2. The one or more computer-storage media of claim 1, wherein converting each blog post to a feature vector comprises:
   extracting at least one of words and phrases from each blog post; and
   determining a feature vector for each blog post based on the at least one of extracted words and phrases.

3. The one or more computer-storage media of claim 2, wherein the method further comprises preprocessing the at least one of words and phrases extracted from each blog post.

4. The one or more computer-storage media of claim 3, wherein preprocessing comprises at least one of stemming, stop-word filtering, and low-usage word filtering.

5. The one or more computer-storage media of claim 2, wherein determining a feature vector for each blog post comprises calculating a term-frequency inverse document frequency for words extracted from each blog post.

6. The one or more computer-storage media of claim 1, wherein generating a map comprises determining a position on the map for each blog post based on the position of each blog post in the low-dimensional space.

7. The one or more computer-storage media of claim 6, wherein generating a map further comprises determining a position for each blog based upon the position of blog posts for each respective blog.

8. The one or more computer-storage media of claim 7, wherein generating a map further comprises labeling the map.

9. The one or more computer-storage media of claim 8, wherein labeling the map comprises determining at least one landmark blog and placing at least one corresponding landmark blog label on the map, that at least one corresponding landmark blog label representing the position of the at least one landmark blog on the map.

10. The one or more computer-storage media of claim 8, wherein labeling the map comprises placing at least one term label on the map, that at least one term label representing at least one topic within a region of the map.

11. In a computer system having a processor, a computer-storage media, and a graphical user interface including a display and a user interface selection device, a method of providing information regarding topics on blog posts within the blogosphere, the method comprising:
displaying a blog map on the display, the blog map having a plurality of blog posts mapped thereto and a plurality of labels displayed thereon, wherein the blog map comprises a two-dimensional or three-dimensional grid having a plurality of nodes and each blog post is mapped to one of the nodes based on each blog post's relative position in a low-dimensional space as determined by converting each blog post to a feature vector based on words contained within each blog post and reducing the dimensionality of each feature vector to the low-dimensional space;
receiving a map entry selection signal indicative of the user interface selection device selecting a portion of the blog map to be monitored for a topic change;
monitoring the portion of the blog map for a topic change; and
communicating an alert to a user when a topic change occurs on the portion of the blog map.

12. The method of claim 11, wherein the method further comprises receiving a second map entry selection signal indicative of the user interface selection device selecting a portion of the blog map to be zoomed.

13. The method of claim 12, wherein the method further comprises displaying the portion of the blog map to be zoomed on the display.

14. The method of claim 11, wherein the method further comprises receiving a second map entry selection signal indicative of the user interface selection device selecting one of the plurality of labels.

15. The method of claim 14, wherein the method further comprises displaying at least one of a blog and a blog post linked from the one of the plurality of labels.

16. One or more computer-storage media embodying computer-useable instructions for causing a computing device to perform a method for generating a blog map to facilitate searching and navigating the blogosphere, the method comprising:
accessing a plurality of blog posts from the blogosphere;
converting each of the plurality of blog posts to a feature vector, each feature vector including a collection of word and term frequency-inverse document frequency weight pairs for a corresponding blog post and representing a position in a high-dimensional space for the corresponding blog post;
reducing each feature vector from the high-dimensional space to a low-dimensional space to provide a representation of a position in the low-dimensional space for each blog post;
generating a blog map based on the position in the low-dimensional space for each blog post by mapping each blog post to a single location within the map corresponding with the position of each blog post in the low-dimensional space; and
labeling the map with one or more landmark blog labels, wherein each landmark blog label represents a relative position of a corresponding blog within the map based on locations within the map of blog posts from the corresponding blog;
receiving data indicative of a user selection of a portion of the map to be monitored for a topic change;
monitoring the portion of the blog map for a topic change; and
communicating an alert to a user when a topic change occurs on the portion of the blog map.

17. The one or more computer-storage media of claim 1, wherein reducing the dimensionality of each feature vector comprises employing at least one selected from the following: a self-organizing map, multi-dimensional scaling, principal component analysis, and latent semantic analysis.

18. The method of claim 11, wherein reducing the dimensionality of each feature vector comprises employing at least one selected from the following: a self-organizing map, multi-dimensional scaling, principal component analysis, and latent semantic analysis.

19. The one or more computer-storage media of claim 1, wherein reducing each feature vector from the high-dimensional space to the low-dimensional space comprises employing at least one selected from the following: a self-organizing map, multi-dimensional scaling, principal component analysis, and latent semantic analysis.

* * * * *

UNITED STATES PATENT AND TRADEMARK OFFICE
CERTIFICATE OF CORRECTION

PATENT NO. : 7,590,612 B2  
APPLICATION NO. : 11/155393  
DATED : September 15, 2009  
INVENTOR(S) : Forrest et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 303 days.

Signed and Sealed this

Twenty-first Day of September, 2010

David J. Kappos  
*Director of the United States Patent and Trademark Office*